(No Model.)
G. M. HULL.
CUT-OFF GOVERNOR.
No. 512,111. Patented Jan. 2, 1894.
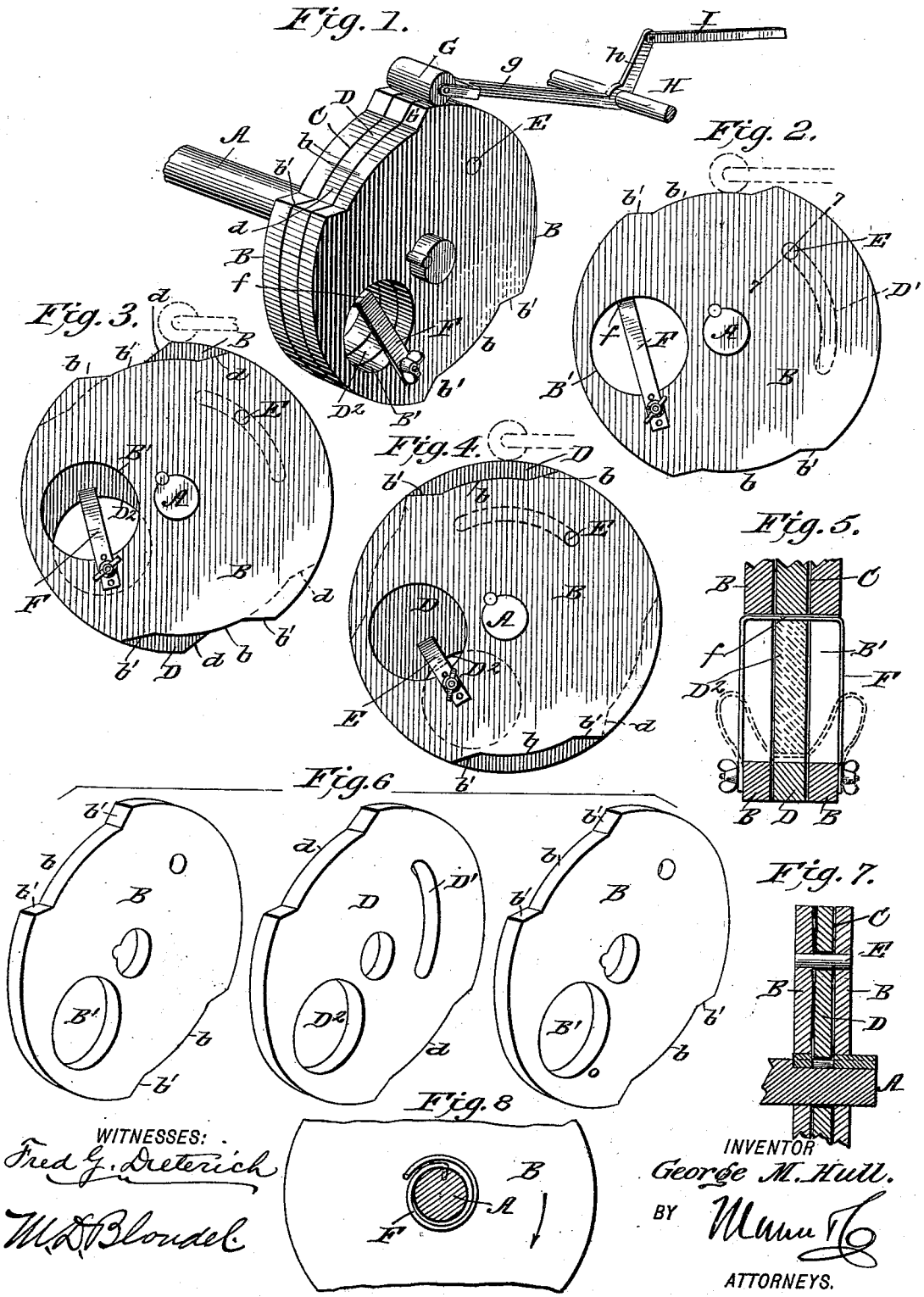
WITNESSES:
Fred G. Dieterich
M. D. Blondel
INVENTOR
George M. Hull.
BY Munn & Co
ATTORNEYS.

UNITED STATES PATENT OFFICE.

GEORGE M. HULL, OF KEARNEY, NEBRASKA, ASSIGNOR OF ONE-HALF TO CHARLES M. HULL, OF SAME PLACE.

CUT-OFF GOVERNOR.

SPECIFICATION forming part of Letters Patent No. 512,111, dated January 2, 1894.

Application filed May 6, 1893. Serial No. 473,313. (No model.)

*To all whom it may concern:*

Be it known that I, GEORGE M. HULL, residing at Kearney, in the county of Buffalo and State of Nebraska, have invented a new and Improved Cut-Off Governor, of which the following is a specification.

My invention relates to an automatic governor for operating the cut off valves of steam engines, and it is more especially adapted for use in connection with rotary or other high speed engines, and it has for its object to provide a mechanism of this character which, while very simple in its construction will effectually and positively operate for its desired purpose.

It has also for its object to provide a cut off device which will operate in such a manner, that the movement of the cut off valve in the steam chest, shall vary in exact proportion to the speed of the rotation of the shaft, forming as it were a variable cut off governor, which automatically shifts as the varied speeds of the shafts may determine.

With other objects in view, which will hereinafter appear the invention consists in the peculiar combination and novel arrangement of parts all of which will hereinafter be fully described and particularly pointed out in the claims, reference being had to the accompanying drawings, in which—

Figure 1 is a perspective view illustrating my improved governor mechanism as applied to a rotary drive shaft. Fig. 2 is an end view illustrating the several disks in their normal or coincident positions. Fig. 3 is a similar view illustrating the loose or adjusting disk at a lag position. Fig. 4 is a similar view showing the loose disk to its extreme lag position. Fig. 5 illustrates the adjustable spring tension devices hereinafter referred to and Fig. 6 is a perspective view of the several disks detached from the shaft. Fig. 7 is a cross section on the line 7—7 Fig. 2 and Fig. 8 is a view of a modification hereinafter referred to.

Referring to the accompanying drawings A indicates the drive shaft which may represent the shaft of a rotary or other high speed engine, on which are fixedly mounted to turn therewith, one or more disks B B, the peripheral edges of which, at diametrically opposite points are cut out to form cam recesses $b$ the ends of which terminate in inclined faces $b'$ $b'$ as shown. In the drawings I have shown two disks B B attached to the shaft spaced apart to form an intermediate space C, such construction being the preferred one, but I desire it understood that in some instances I may employ but one of such disks.

In the space C is fitted, loosely upon the shaft A, a disk D which in outline is of the same contour as the disks B and when held to its normal position (in a manner presently explained) its peripheral recesses $d$ $d$ are coincident with the recesses $b$ in the disks B, as clearly shown in Fig. 2 of the drawings. This disk D is held on the shaft A for a limited motion reversely to the direction of rotation of the shaft A, the extent of such reverse motion being in practice equal the distance between the opposite ends of the cam recesses $b$, of disks B, and for such purpose the loose disk D has a segmental slot D' through which passes a stop or stud pin E, projected from one or both of the disks B. (See Fig. 7.)

To render the operation of the loose disk the more effective for its desired purpose, one side is weighted, preferably by cutting out the other side as at $D^2$. To hold the loose disk D to its normal position, i. e., with its recesses $d$ coincident with the recesses $b$ in disks B, suitable spring devices are provided which may be arranged by placing a torsion spring on the shaft A and connecting it with such shaft and disk as shown in Fig. 8 or as shown in Figs. 1 and 5. In the latter construction (which is the preferred one) I provide a bail spring F adjustably secured at its ends in openings B' in the disks B, its bail or bearing portion $f$ projecting into the aperture $D^2$ in the disk D and bearing against the said disk as shown.

G indicates a trolley mounted on one end of a crank arm $g$ projected from a rock shaft H, which has a crank member $h$ connected to the slide valve rod I which is joined with the slide valve of an engine in any well known manner.

The operation of my improved devices is best explained as follows: Assuming for example the normal speed of the shaft A to be five hundred revolutions per minute, the tension of the spring F would be first adjusted to hold the loose disk D in register with the disks B to travel in unison therewith. Now as the speed of the shaft increases beyond the amount stated, the increased inertia of such shaft will overcome the tension of the spring F, as such spring will fail to overcome the lag or back thrust motion of the disks D, which lag motion is caused by the fact of its being loosely mounted on the shaft A, and is augmented by the unequal weight of its opposite sides. It will thus be seen that as the disk D falls back or lags its cam recesses $d$ will begin to move out of register with the recesses $b$, and its straight peripheral edge will move across the said recesses $b$ as shown in Fig. 3 and thereby proportionately decrease the throw of the valve rod and slide valve, and as the steam supply thus diminishes and the rotation of the shaft decreases, the disk D will gradually move back again, until it reaches its normal position, which will take place as soon as the revolution of the shaft A reaches its normal speed. Should the engine go "hunting" by the release of its load or other cause and the speed of the shaft be quickly increased to a very high degree it is manifest that the lag of the disk D would be relatively quick and to its full degree as shown in Fig. 4, which would serve to close off at once the cam recesses, and thereby hold the valve rod and valve to their cut off positions.

It will be noticed in the construction shown that the trolley travels at all times on the peripheral edges of the loose and fixed disks, making the action of the change in the disk recesses on the trolley quick and positive. By arranging two disks and placing the loose disk between them, a more stable construction is provided as they serve to hold such loose disk from sidewise motion or wabbling. When three or more disks B are employed I prefer to use a loose disk in each space formed between them.

It is obvious that by providing an adjustable spring for holding back the lag movement of the loose disk D its tension can be set relatively to the predetermined normal speed of the shaft. It is also manifest that while each disk as shown has but two cam recesses in its periphery a less or greater number of such recesses may be provided when desired.

Having thus described my invention, what I claim, and desire to secure by Letters Patent, is—

1. An improved governor for steam engines, in combination with a rotary shaft, a fixed cam secured thereon, a second cam loosely mounted thereon and held for a limited reverse or lag motion as the shaft rotates whereby to close over the cam recesses in the fixed cam, and a valve operating crank arm engaging both of the aforesaid cams, all substantially as and for the purposes described.

2. In a cut off governor mechanism in combination, a drive shaft, a disk B fixedly held thereon, having a peripheral cam recess $b$, a second disk D loosely held on said shaft, said disk having a cam recess $d$ and tension devices for holding the loose disk with its recess coincident with the fixed disk recess, during the normal speed of rotation of the shaft and a valve operating crank arm engaging the edges of the loose and fixed disks substantially as shown and described.

3. In a cut off governor mechanism the combination with the shaft A, the disks B fixedly secured thereto, and formed with one or more cam recesses $b$, of a similarly shaped disk D loosely held on the shaft A for a limited reverse or lag motion, and a valve rod operating trolley arm engaging the edges of such disks, as and for the purposes described.

4. In a cut off governor mechanism, the combination with the shaft A, the disks B fixedly secured thereto having one or more cam recesses, of a similarly shaped disk D loosely held on such shaft between the disks B, having one side weighted and held for a limited reverse or lag motion on such shaft and a valve rod operating crank arm engaging the edges of the disks all substantially as and for the purposes described.

5. In a cut off governor mechanism, in combination the rotary shaft A, the disk B fixedly held thereon, and having one or more peripheral cam recesses, a similarly shaped disk D loosely held on such shaft for a limited reverse or lag motion and an adjustable spring arranged to engage the disk D to hold its cam recesses connected with the recesses in the disk B during the normal rotation or speed of the shaft A all arranged substantially as shown and for the purposes described.

6. A valve shifting cam mechanism consisting of two similarly formed cam disks, one fixedly held on the shaft, the other loosely held and arranged for a limited reverse or lag motion, and means for holding the loose disk up to a coincident position with the fixed disk during the normal speed of the shaft, substantially as shown and described.

GEORGE M. HULL.

Witnesses:
SOLON C. KEMON,
FRED G. DIETERICH.